April 8, 1952     J. A. DAHLSTROM     2,592,396

HOT-AIR FURNACE, PARTICULARLY OF THE FORCED-DRAFT TYPE

Filed Jan. 23, 1948     7 Sheets-Sheet 1

FIG. 1     FIG. 2

INVENTOR,
John A. Dahlstrom
BY West Oldham
ATTYS.

April 8, 1952         J. A. DAHLSTROM         2,592,396
HOT-AIR FURNACE, PARTICULARLY OF THE FORCED-DRAFT TYPE
Filed Jan. 23, 1948                              7 Sheets-Sheet 3

FIG. 5

INVENTOR,
John A. Dahlstrom
By
West & Oldham
ATTYS.

FIG. 5a

INVENTOR,
John A. Dahlstrom
BY
Week Oldham
ATTYS.

April 8, 1952  J. A. DAHLSTROM  2,592,396
HOT-AIR FURNACE, PARTICULARLY OF THE FORCED-DRAFT TYPE
Filed Jan. 23, 1948  7 Sheets-Sheet 5

FIG. 6

INVENTOR,
John A. Dahlstrom
BY
West Oldham
ATTYS.

FIG. 6a

April 8, 1952 J. A. DAHLSTROM 2,592,396
HOT-AIR FURNACE, PARTICULARLY OF THE FORCED-DRAFT TYPE
Filed Jan. 23, 1948 7 Sheets-Sheet 7

INVENTOR,
John A. Dahlstrom
BY
Wesby Oldham
ATTYS.

Patented Apr. 8, 1952

2,592,396

UNITED STATES PATENT OFFICE 2,592,396

HOT-AIR FURNACE, PARTICULARLY OF THE FORCED-DRAFT TYPE

John A. Dahlstrom, Bay Village, Ohio, assignor to Perfection Stove Company, Cleveland, Ohio, a corporation of Ohio Application January 23, 1948, Serial No. 3,917

17 Claims. (Cl. 126—110)

This invention relates, generally, to heating apparatus, and more particularly to improvements in forced-draft hot-air furnaces of the type disclosed and claimed in my co-pending application Serial No. 701,302, filed October 4, 1946, which has now been issued Patent No. 2,561,100, dated July 17, 1951. While the present application and the one above mentioned show oil burning furnaces, it will be understood that many of my improvements are applicable to furnaces employing other kinds of fuel, particularly gas.

The type of furnace above referred to as exemplified in my former application, occupies very little floor space, being tall and slender, wherefore it is especially adapted for installation in close proximity to walls, as in closets of small apartments or dwellings where the distance between the side and rear walls of the furnace and the corresponding walls of the closet need be no more than two inches. In such installations as the last mentioned, only the front of the furnace is conveniently accessible.

Therefore, it is an object of my invention to provide a furnace of the above mentioned type that can be conveniently installed, in restricted quarters, completely from the front, even to the inclusion of making flue, fuel supply, and electrical connections; and to provide a furnace of said type that is capable of being repaired and serviced entirely from the front, including removal and replacement of the combustion chamber assembly; independent removal and replacement of the burner; and the periodic cleaning of the radiator, the changing of filters, the occasional inspection of, and attention to, the burner, air circulating fan or blower, and inspection and adjustment of the limit switch that is a part of the automatic electrical control system common in such furnaces.

Another object of the invention is to provide novel means for supporting the combustion chamber assembly in the furnace casing, which means facilitates emplacement, and insures proper positioning, of said assembly in the casing.

More specifically, it is an object of my invention to provide a furnace of the type aforesaid comprising an open-front casing having movable or detachable closure means for the front thereof, and an assembly consisting of a combustion chamber, radiator, and desirably a burner, which assembly, as a unit, may be emplaced in and removed from the casing through the open front thereof and wherein the radiator unit is arranged in front of the combustion chamber and includes a clean-out that is substantially in register with a flue connection between the radiator and the combustion chamber so that access to both radiator and the adjacent portion of the combustion chamber may be had through said opening. As is customary in hot air furnaces that incorporate a radiator combined with a combustion chamber, the outlet spud for the products of combustion leads from the radiator; and an advantage rising from the arrangement just described is that said spud is located adjacent the front top portion of the furnace where it is especially convenient of access. Also, an advantage in having the clean-out of the radiator substantially aligned with the flue connection between the radiator and combustion chamber is that a sight means may be incorporated in the cover of the clean-out opening which enables the fire conditions in the combustion chamber to be readily observed.

A further object of the invention is to increase the efficiency of furnaces of the type to which the invention pertains by providing air deflectors or baffles that are of such design and are so located that the air impelled upwardly through the casing is caused to spread about and absorb heat from the combustion chamber and the radiator, and to follow a somewhat tortuous passage in its upward travel to the usual plenum chamber that surmounts the casing and from which the heated air is distributed in the customary manner.

A still further and related object is to so arrange and mount said deflectors or baffles that they will not interfere with the emplacement and removal of the combustion chamber assembly, nor require detachment in the performance of such operation, and this end is accomplished by attaching the deflectors or baffles that are to the rear of the assembly to parts of the casing, and those that are adjacent the front of the assembly, to the latter.

Another object in the direction of efficient and economical operation is to provide baffles inside the combustion chamber so arranged that they cause the products to be diffused throughout the chamber and sweep downwardly along the wall thereof adjacent the outlet thereby to insure the maximum of heat transfer from the products to the circulating air.

Objects and advantages additional to the foregoing will appear as I proceed to describe in detail the embodiment of the invention illustrated in the accompanying drawings, wherein Fig. 3 is a plan view of the furnace; Figs. 6 and 6a represent a sectional side elevation, just inside the right hand side wall of the casing, as indicated by the lines 6—6a of Figs. 1 and 3, the adjacent side liner and other parts being broken away beyond the plane of section, the present views corresponding, in area, respectively, to Figs. 5 and 5a.

The casing of the furnace, designated generally by the reference numeral 1, incorporates at its lower end a base frame 2 that is supported a suitable distance above the floor by legs 3. The base frame is fabricated of sheet metal parts, and is open throughout most of its top and bottom areas, and removably contained therein is an air filter 5. Mounted on the top wall 6 of the casing is a plenum chamber 7, a fragment of which is included in Figs. 1, 2, 5 and 6. In accordance with customary practice, the heated air is distributed from the plenum chamber to locations that are to be heated, through the usual conduits (not shown); and air is returned in similar fashion from said locations to the space below the base frame 2 for admission through the filter 5, such circulation being induced by means presently to be described. Assuming that the return conduit registers with one of the four sides of the space below the base frame, the other sides may be closed by plates 2a that are detachably connected in any approved manner to the legs 3 or to other parts of the structure; or the furnace, minus the legs, may stand directly on the floor over a pit to which the air is returned. With reference to the plenum chamber and its mounting, the top wall 6 has a relatively large rectangular opening along the sides of which extend upstanding flanges 8, and the plenum chamber, consisting of an open bottom sheet metal rectangular casing, fits down over said flanges.

Figure 4:
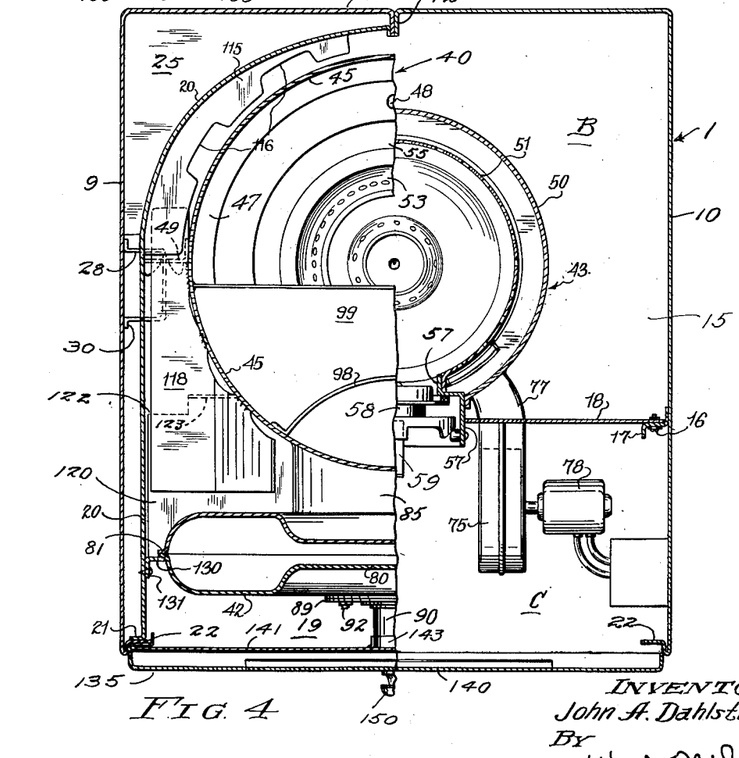
Fig. 4 is a horizontal section, in offset planes, substantially on the line 4—4 of Fig. 1, and on a scale considerably larger than that of the preceding views.
Figure 5:
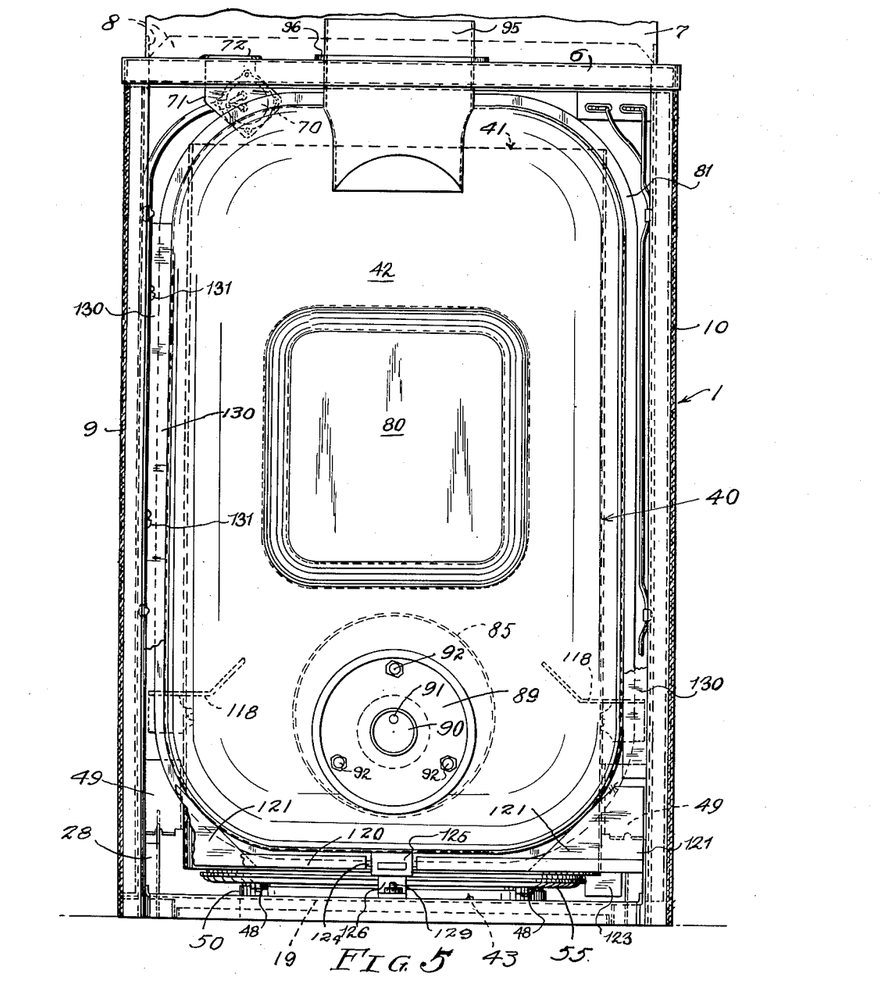
Figs. 5 and 5a represent a sectional front elevation of the furnace, on the same scale as Fig. 4, the plane of section being just inside the front panels, as indicated by the lines 5—5a of Figs. 2 and 3, Fig. 5 embracing the upper half of the structure, and Fig. 5a the lower half thereof.
Figure 5A:
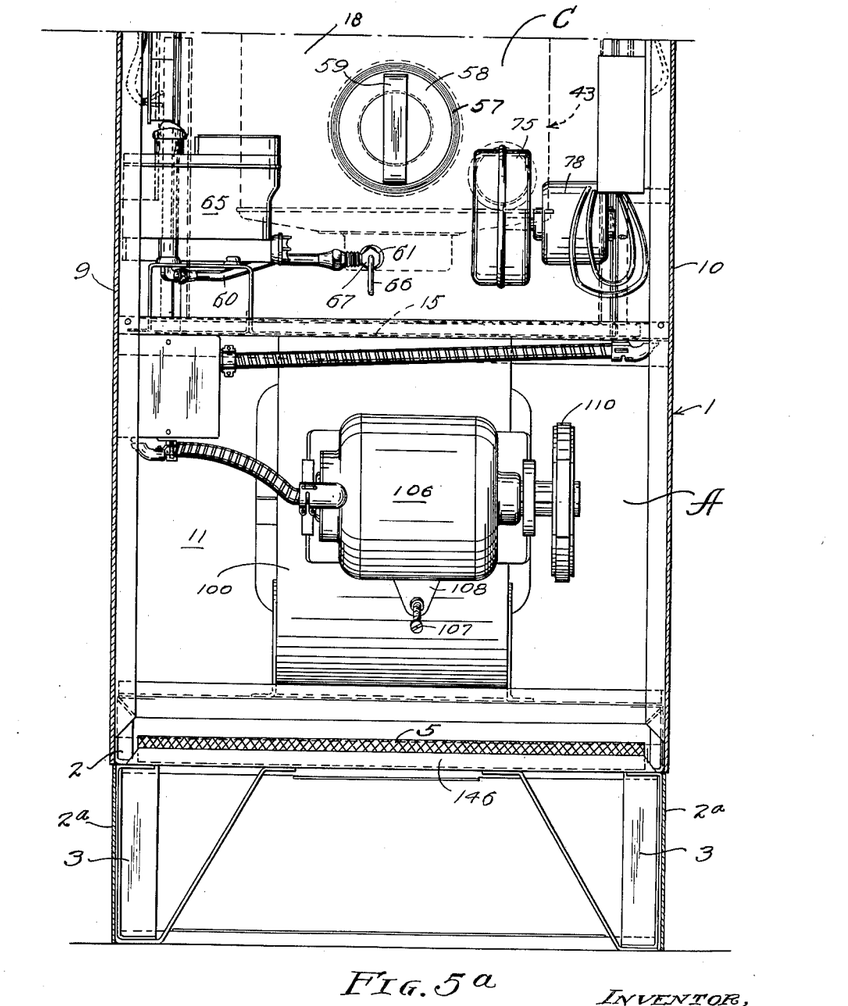

While each side of the casing and the adjacent half of the back thereof are made from a continuous piece of sheet metal, as best appears from Fig. 4, I shall, for descriptive purposes, refer to the casing as including side walls 9 and 10 and a back wall 11, the parts of the beforementioned pieces of sheet metal which constitute the back wall being flanged along their inner edges and connected together within the area of the flanges, as indicated at 12. The top wall 6 has a depending edge flange that telescopes over and is suitably fastened to the upper ends of the walls 9, 10 and 11 and overhangs the open front of the casing, which is normally closed by means presently to be described.

The interior of the casing 1 is set off by elements, presently to be introduced, into a blower compartment A that is immediately above the base frame 2; burner and control compartments B and C, respectively, which are directly above the compartment A, the control compartment C being in front of, and of lesser volume than, the burner compartment B; and a heating compartment D that takes up the remainder of the casing.

A horizontal partition 15 separates the compartment A from the compartments B and C, said partition being of sheet metal and flanged downwardly about its lateral and rear edges and suitably connected to the side and back walls of the casing. The control compartment C is separated from the burner compartment B by a vertical partition or so-called "control panel" 18 that rises from the partition 15. The top of the control compartment C is closed by a horizontal wall 19 that extends from the upper edge of the panel 18 to the front of the casing. The panel 18 and wall 19 are detachably connected, by suitable fastening means 16, to vertical and horizontal portions, respectively, of frame-like members 17 at the ends of the control compartment C.

Side liners 20 curved forwardly from the transverse center of the back wall 11 and, beyond their curved portions, continue in parallel relation to where their front edges are turned outwardly to provide flanges 21. These flanges 21 are engaged with the rear sides of flanges 22 that are inset from the front plane of the casing. The flanges 22 are desirably integral with the side walls 9 and 10 and are shown as formed by turning the front edge portions of said walls inwardly upon themselves and thence toward each other. The side liners 20 extend upwardly from about the horizontal plane of the previously mentioned wall 19 that defines the top of the control chamber C, and terminate at their upper ends near the top wall 6. The spaces between the curved portions of the side liners 20 and the rear corners of the casing are closed at their lower ends by plates 25. These plates extend from the rear wall 11 forwardly to about the junction between the curved portions of the side liners 20 and the straight areas thereof.

Supports 28, shown as sheet metal channels (Fig. 8), are secured to the side walls 9 and 10 of the casing below the lower edges of the side liners 20, the upper portions of the side flanges of said supports being partially cut away to accommodate said liners. Therebelow, where said flanges remain intact, their edges are turned outwardly to provide base flanges 30 that are welded to the side walls 9 and 10. The upper end of the web of each support 28 is profiled to provide a substantially horizontal ledge portion 31, a cam portion 32, and a notch 33, rearwardly of which there is a stop 34.

Removably sustained within the casing 1 by the supports 28, in a manner presently to be described, is an assembly, designated generally by the reference numeral 40, including a combustion chamber 41 (for which reason it is herein referred to as the combustion chamber assembly). This assembly also includes a radiator 42, and, according to the present embodiment, a combustion device or burner, generally denoted 43. The term "combustion chamber" is used herein in the tangible sense, as meaning a structure made up, in the present case, of a cylindrical wall 45, a circular top wall 46, and an annular bottom wall 47. Lugs 49 are welded to the sides of the combustion chamber, near the bottom of the latter, and their lower ends are bifurcated and turned forwardly. These lugs normally bear on the bottom walls of the notches 33 of the supports 28 and engage the stops 34, thereby to sustain the assembly 40 in an upright position. Detachably connected to and suspended from the bottom wall 47, through the medium of studs or the like 48, of which there may be three or four, is the aforesaid combustion device or burner 43, the same being shown as consisting of a cylindrical air housing 50 and a burner bowl 51 enclosed thereby. A perforated throat structure 53 connects the annular top wall 54 of the burner bowl to a stepped ring 55, the upper end of the housing 50 being connected to a cylindrical part of said ring, as by welding. Tie members 56, of which there may be four, and which consist of narrow metal bars suitably spaced apart about the burner bowl, rigidly unite said bowl and the ring 55, relieving the throat structure 53 of the strain that would otherwise be imposed on it. For details of this particular combustion device or burner, reference may be made to an application filed by Marc Resek, August Bolz and myself on December 1, 1947, Serial No. 789,052, which has now been issued as Patent No. 2,588,045, dated March 4, 1952.

A lighting and cleanout opening in the front portion of the peripheral wall of the burner bowl 51 is surrounded by a sleeve 57 that extends through a flanged opening in the adjacent portion of the air housing 50 and through a hole in the control panel 18. Said opening is normally closed by a plug 58, provided with a handle 59, all of which is in accordance with prevailing practice. Liquid fuel is supplied to the burner bowl, through pipes 60 and 61, from a so-called constant level control valve 65, that is in communication with a source of supply (not shown). This unit is a standard, commercial article and includes a metering valve, and an electrical device for governing the supply of fuel to the burner bowl, such device being a part of the usual automatic electrical control system including a room thermostat. Extending through the conduit 61 is a flexible cleaning element of common type that is provided with a handle 66 for reciprocating the element, a packing gland 67 serving to seal the end of the conduit 61 about the handle 66.

As is customary, said automatic electrical control system includes a so-called "limit switch" that is situated within the hot air circulating space of the furnace, usually adjacent the top thereof, and the purpose of which is to shut off the supply of fuel to the burner, or otherwise render the burner temporarily inoperative, in case the temperature of the circulating air approaches a dangerously high degree.

Figure 1:
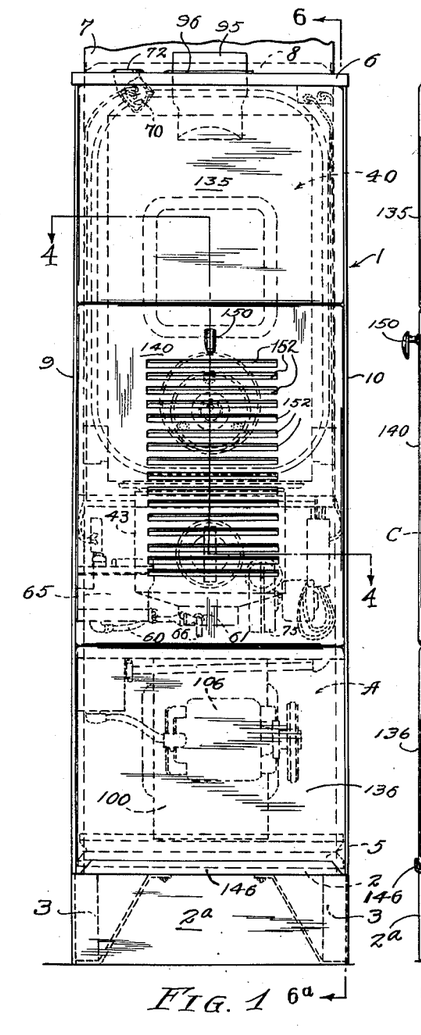
Fig. 1 is a front elevational view, and Fig. 2, a side elevational view, of a furnace incorporating my improvements.
Figure 2:
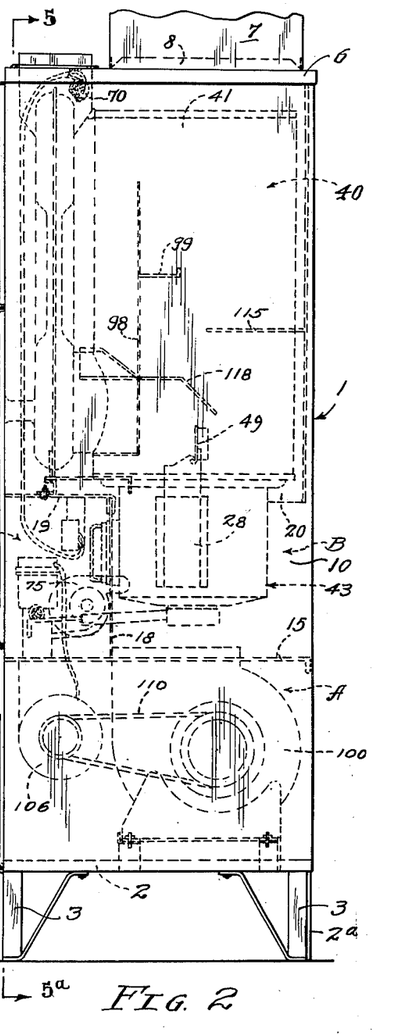
Figures 3, 11:
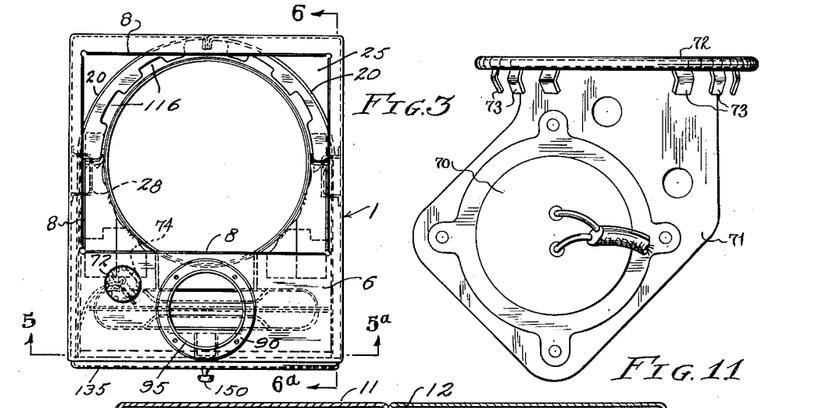

It is a feature of my invention to support the limit switch, indicated at 70, on a bracket 71 that is carried by a closure in the form of a circular plate or so-called "button" 72, provided with resilient prongs 73, and which normally closes an opening in the top wall 6 of the furnace. Said opening, otherwise circular, is straight along one side, as shown in dotted lines at 74 in Fig. 3, and prongs are omitted from the corresponding side of the button 72, as appears from Fig. 11. Accordingly, the button can be inserted in the opening in only one position, with the prongs coacting with the surrounding portion of the wall 6 to yieldingly retain the button in place. The limit switch 70 is thus positioned in definite relation to the combustion chamber and other parts from which it receives radiant heat. This insures against appreciable variation in the temperature value at which the switch operates.

It is to be noted that the handle of the plug 58 for the lighting and cleanout opening of the burner bowl, the constant level valve 65, including certain adjustments that have to be made manually, and the handle 66 of the cleaning element for the pipe 61 that conducts fuel to the burner bowl, are all located in the control compartment C. Also situated in this compartment is an air impeller or blower 75, shown as of the type involving a snail shell casing, and the outlet of the impeller or blower is placed in communication with the air housing 50 through a conduit 77 that extends through a hole in the control panel 18. The air impeller or blower 75 is driven by an electric motor 78. The air thus supplied to the housing 50 about the burner bowl 51, enters the combustion space through the usual openings or passages provided for the purpose, including perforations in the peripheral wall of the bowl, and those in the throat structure 53. Under the influence of the forced draft created by the impeller or blower 75, the products of combustion rise well into the combustion chamber, notwithstanding the fact that the outlet for the products is near the bottom of the chamber, as will hereinafter more fully appear, but to insure a more thorough diffusion of the products throughout the chamber, and their wiping about the walls thereof so as to attain the maximum of heat transfer between them and the circulating air outside said walls, I may include baffles inside the combustion chamber, which I shall presently describe.

Situated forwardly of the combustion chamber and occupying the upper front portion of the furnace casing, above the top wall 19 of the control compartment C, is the previously mentioned radiator 42. This radiator is made up of two substantially identical sheet metal shells, that are formed with depressed central portions 80 and edge flanges 81, and that are reversely arranged and have their edge flanges engaged with each other and welded together. On its rear side and adjacent its lower end the radiator is provided with a relatively large opening 83 that aligns with an opening 84 of similar size in the front of the combustion chamber; and a flue 85 connects the radiator and combustion chamber about said openings. The front of the radiator is provided with an opening 88 that is opposite the opening 83 and is normally closed by a cover 89 that carries a sight tube 90 which projects forwardly from the cover and registers with a central opening thereof. The front end of the sight tube is closed except for a relatively small peek hole 91. The cover 89 is removably attached to the radiator by studs and nuts designated 92. At its upper end, the radiator is fitted with an outlet spud 95 that extends upwardly through a hole in the top wall 6 of the casing and is surrounded by a collar 96 immediately above said wall. In order to render the assembly stronger and more rigid, and to eliminate strains that would otherwise be imposed on the connections of the flue 85, the outlet spud 95 is fastened at 97 to the top front portion of the combustion chamber.

Figure 6:
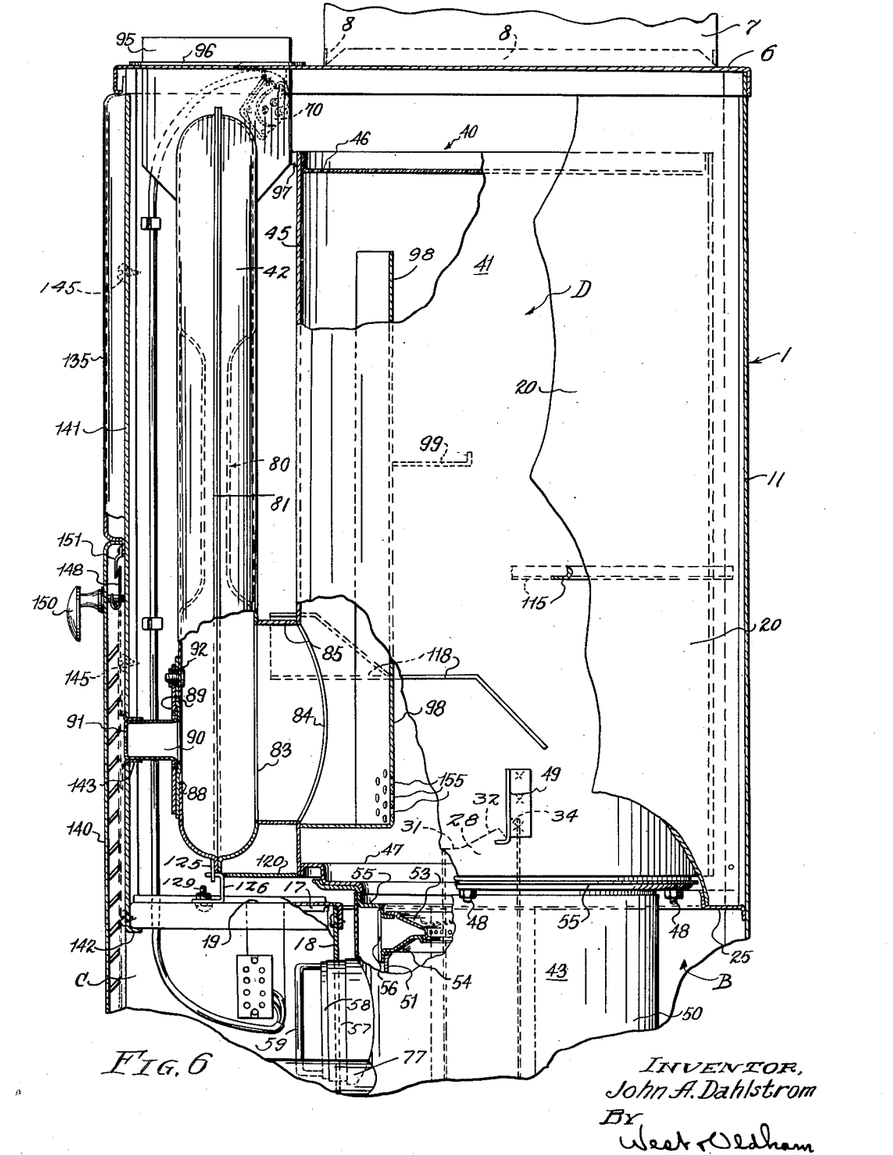
Figure 6A:
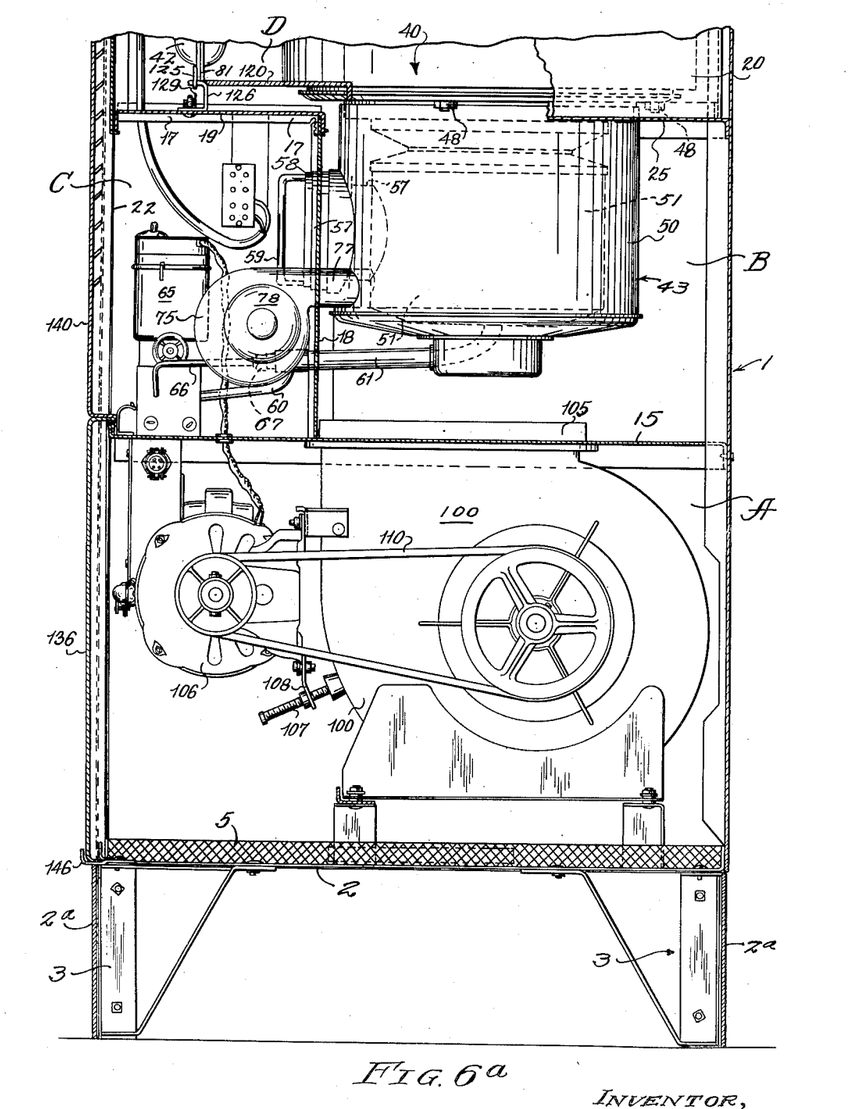

As previously stated, baffles may be used to advantage inside the combustion chamber, and especially is this true with respect to apparatus in which the combustion air is drawn into the combustion space, by chimney draft or otherwise, as is usual when gas is employed as the fuel, instead of being forced into said space, as in the present instance. However, for reasons already stated, I locate baffles in the combustion chamber, and they are shown in Figs. 4 and 6 where they are designated 98 and 99. The baffle 98 consists of a vertically disposed, transveresly curved plate that has its lateral edges attached to the peripheral wall of the chamber and its lower end turned forwardly to engage said wall below the plane of the opening 84. The other baffle 99 extends horizontally and rearwardly from the baffle 98 near the upper end of the latter. With this arrangement of baffles, the products are projected upwardly into the combustion chamber under the influence of the forced draft created by the impeller or blower 75, being first thoroughly diffused throughout the rear portion of the combustion chamber from bottom to top thereof, the products then descending through the space between the front of the combustion chamber and the baffle 98, giving off heat to the adjacent portion of the combustion chamber wall as the products descend and escape through the flue 85 to the radiator 42, therein to expend much of their remaining heat on their way to the outlet spud 95 which is connected in the usual way to a flue or chimney.

Suitably supported by the base frame 2 within the compartment A is an air impeller or blower 100 that draws air inwardly through the filter 5 and discharges it upwardly into the furnace casing about the combustion chamber assembly. In mounting the impeller or blower, the usual precautions are taken to absorb any vibration thereof by providing cushioned connections between the casing of the impeller or blower and the parts that support it; and the outlet mouth of the casing is projected upwardly through a relatively large rectangular opening in the partition 15 with a cushion element 105 interposed between said mouth and the partition. An electric motor 106, by which the impeller or blower is driven, is shown as mounted on the front side of the casing of the impeller or blower where it may be readily reached for purposes of lubrication and belt adjustment, the latter being effected in the present instance by rocking the motor through the medium of an adjusting screw 107 that is threaded through an extension 108 of the motor base and bears inwardly against a part on the blower or impeller casing. The belt, designated 110, is engaged over pulleys on the respective shafts of the motor and of the air impeller or blower.

The air that is discharged from the air impeller or blower 100, as it rises through the circulating space of the furnace, is thoroughly distributed about the combustion chamber and radiator by several effective and advantageously placed baffles which I shall now describe. Attached to the liners 20, somewhat below their vertical centers, and extending about the rear side of the combustion chamber 45, are baffles 115. The inner edge of each baffle 115 approaches rather closely the wall of the combustion chamber excepting where interrupted by notches 116. The baffles, being of the shape described, or of a construction equivalent thereto, permit a good percentage of the air rising through the rear portion of the casing to flow along the corresponding side of the combustion chamber in close proximity thereto so as to be heated to a desirable temperature before reaching the plenum chamber 7 for distribution. Obviously, the remainder of the air that would otherwise rise about the rear side of the combustion chamber will be deflected toward the front and receive heat from the portion of the combustion chamber forwardly of said baffles.

Figures 7, 8, 9, 10:
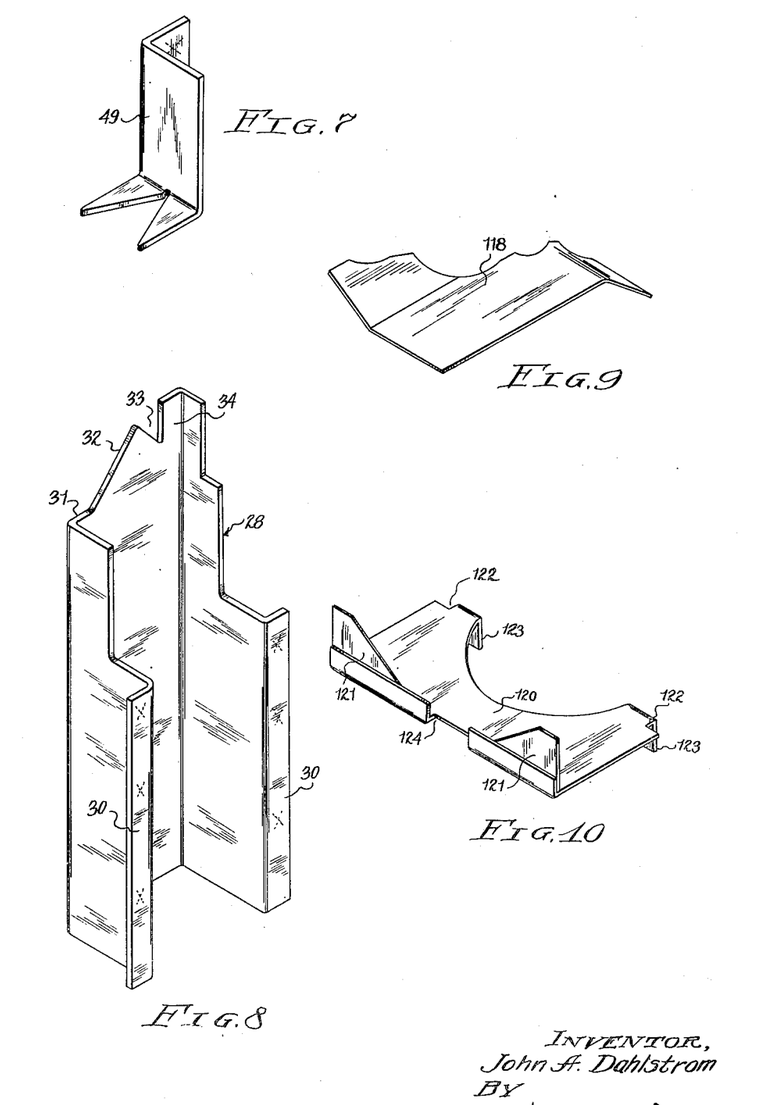
Fig. 7 is a perspective view of one of the combustion chamber lugs.
Fig. 8 is a similar view of one of the combustion chamber supports wherewith a lug of the combustion chamber cooperates.
Figs. 9 and 10 are perspective views of deflectors or baffles that are incorporated in the combustion chamber assembly, and Fig. 11 (Sheet 2) is a detail of the limit switch supporting plate or button.

118 denotes baffles that are below and forwardly of the baffles 115. The greater part of the area of each baffle 118 is in a horizontal plane, the baffle being inclined downwardly at its rear end, and inwardly and upwardly adjacent its forward end, as best shown in Figs. 6 and 9. The inner edges of these baffles follow, in a general way, the contour of the combustion chamber, and where said edges contact the wall of said chamber, they are welded thereto. The baffles 118 intercept the air that rises vertically along the sides of the combustion chamber and directs it forwardly and inwardly about the front portion of the chamber, or, in other words, across the area thereof that is in front of the baffle 98 which is located inside the combustion chamber. Also, a part of this air wipes over the flue 85 and up the rear side of the radiator 42 so as to receive heat from these parts.

A baffle 120, shown in perspective in Fig. 10, extends about, and forwardly from, the lower end of the combustion chamber 41 beneath the radiator 42 where its front edge is flanged upwardly and has triangular extensions 121 welded thereto that follow, in a general way, the contour of the lower rounded corners of the radiator. The baffle 120 extends in a transverse direction substantially from one to the other of the front portions of the liners 20, excepting where the sides of the baffle are cut away at 122. The rear ends of the parts of the baffle 120 that extend about the sides of the combustion chamber are turned abruptly downwardly, as shown at 123. At its transverse center, the flanged front edge of the baffle is notched at 124 in order to accommodate a slotted plate 125 that is welded to the bottom of the radiator and through which is adapted to be projected the forwardly turned upper end of a leg 126 that supports the radiator and has its lower end also turned forwardly to provide a base flange that is secured by suitable fastening means 129, such as a bolt and nut, to the top wall 19 of the control compartment C. Air ascending about the front portion of the air housing 50 will be caused, by the baffle 120, to pass forwardly and rise along the front side of the radiator before reaching the plenum chamber 7, and this action is further promoted by angle strips 130 that are detachably connected, as by screws 131, to the liners 20, said strips extending from adjacent the upper ends of the extensions 121 of the baffle 120 to near the top of the radiator.

The front of the casing 1 is normally closed by a top panel 135, a bottom panel 136, and a door 140 that occupies the space between said panels. As best shown in Fig. 6, the panel 135 extends from beneath the flanged front edge of the top wall 6 downwardly to a horizontal plane well above the cleanout opening 88 of the radiator 42, while a liner 141 of said top panel extends from adjacent the upper edge of the latter downwardly below the top wall 19 of the control compartment C, where it terminates in an inwardly directed flange 142. Said liner 141 has an aperture in alignment with the sight tube 90, which aperture is shown as surrounded by a flange 143 that telescopes over the outer end of said tube. The top panel 135 is removably held to the front of the casing by suitable means, desirably by screws 145 that extend through holes in the edge portions of the panel liner 141 and are threaded into the front flanges of the casing. A lip at the top of the panel 135 is engaged under the front flange of the top wall 6. The bottom panel 136 closes the front of the compartment A and is removably connected to the casing, as by having its lower edge engaged within an angle bar 146 that is carried by and extends along the front of the base frame 2. In the present instance, the upper end of the bottom panel is shown as turned inwardly and downwardly over a vertical flange rising from the front of the partition 15.

The lower edge of the door 140 is shaped to interlock with the top of the bottom panel 136, and at its upper end is provided with latch means 148 that includes a handle 150 by which the latch means may be engaged with and disengaged from a keeper 151 that is carried by the panel 135 near the lower edge thereof. Thus the door 140 may readily be removed to afford access to the peek hole 91, and to the parts enclosed within the control compartment C. The door is shown as having louvered openings or slots 152 through which atmospheric air is admitted to the control equipment to satisfy the demands of the air impeller or blower 75. It may here be mentioned that the combustion chamber baffle 98 has openings 155 within the sight range of the peek hole 91.

Therefore, for observation of the fire through the peek hole 91 and openings 155, and for ordinary adjustments of, and attention to, the parts within the control compartment C, the door 140 may be removed. In order to gain access to the air impeller or blower 100 and its motor 106 for lubricating purposes or adjustment of the belt 110, and in order to reach the filter 5 for cleaning or replacement, the bottom panel 136 is detached from the casing. However, when it is desired to clean out the radiator 42, or inspect the combustion chamber assembly 40, the panel 135, with its liner 141, is disconnected and removed from the acsing. With this done, convenient access is had to the fastening means of the cover 89 of the cleanout opening 88 of the radiator. Now, in case it becomes necessary to remove the burner, or the entire combustion chamber assembly, the equipment is first taken out of the control compartment and the housing of the latter dismantled, when the burner may be detached from the combustion chamber and removed from the burner compartment B; or the entire assembly 40 may be lifted from the supports 28 and lowered enough to withdraw the spud 95 from the hole in the top wall 6, after which the assembly may be lifted out through the open front of the casing 1. According to the present construction, the angle strips 130 must be removed preparatory to performing this latter operation.

In emplacing the assembly 40 in the casing, after inserting the outlet spud 95 upwardly through the hole in the top wall 6, the lower ends of the lugs 49 are engaged with the ledge portions 31 of the supports 28 and when the assembly is shoved back into the casing, the lugs override the cam portions 32 and drop into the notches 33, the stops 34 aiding in vertically positioning the assembly, while the bifurcated ends of the lugs, riding down the front walls of the notches, perform the function of centering the assembly in a transverse direction in the casing.

It is evident from the foregoing that my invention provides a highly efficient furnace of the type set forth which is convenient of installation in restricted space and is capable of being serviced and repaired entirely from the front. By locating the button 72 adjacent a front corner of the top of the furnace, the limit switch 70, that is carried by said button, is placed in convenient reach for purposes of inspection and adjustment. On such occasions, the button is pried up against the action of the prongs 73 and is lifted to withdraw the switch from the casing.

While I have said that the door 140 may be removed for certain purposes including observation of the fire through the peek hole 91, this latter end may be accomplished at any time without removing the door, providing, as in the present embodiment, the parts are designed to dispose one of the slots of the door in line with said peek hole and the openings 155.

Having thus described my invention, what I claim is:

1. In a furnace, a casing adapted for the circulation of air therethrough, a housing in the lower front portion of the casing enclosing a control compartment, the space to the rear of said control compartment constituting a burner compartment, a combustion chamber occupying the portion of the casing above the burner compartment, a burner unit in operative relation to the combustion chamber and occupying the burner compartment, the said housing being constructed to provide access to the burner, fuel supply and control means within the control compartment having communicative connection with the burner unit, a radiator located within the front portion of the casing above the aforesaid housing, flue connections between the lower portions of the radiator and combustion chamber, an outlet spud at the top of the radiator, the top of the casing having an opening corresponding in position with said spud, means removably supporting the combustion chamber and radiator in the casing, a panel and a door therebelow detachably connected to the casing and closing the front of the control compartment and the casing thereabove, said door extending from adjacent the bottom of the control compartment to an elevation above the flue connections between the combustion chamber and radiator, and said panel extending from the door to the top of the casing, a liner for said panel extending from the top thereof downwardly inside the door to substantially the horizontal plane of the top of the control compartment, the radiator having a clean-out opening opposite said flue connection, and a closure for said clean-out opening, the closure having a peek hole and the liner of said panel an opening registering with said peek hole.

2. In a furnace, a casing having air admitting means adjacent the bottom thereof and air oulet means at its top, a partition spaced above the bottom of the casing and setting off therebelow an air impeller compartment, a dismountable housing disposed above the front portion of the partition and defining therewith a control compartment, the space to the rear of said control compartment constituting a burner compartment, a combustion chamber occupying the portion of the casing above the last mentioned compartment, a burner unit applied to the bottom of the combustion chamber and occupying the burner compartment, the said housing being constructed to provide access to the burner, fuel supply and control means within the control compartment and having communicative connection with the burner unit, the aforesaid partition having a relatively large opening within the area of the burner compartment, an air impeller within the first mentioned compartment arranged to discharge air through said opening into said burner compartment, a motor adjacent the impeller having driving connection therewith, a radiator located within the front portion of the casing above the aforesaid housing, flue connections between the lower portions of the radiator and combustion chamber, an outlet spud at the top of the radiator, the top of the casing having an opening corresponding in position with said spud, the combustion chamber having lugs extending from the sides thereof adjacent its lower end, supports carried by the sides of the casing wherewith said lugs engage for supporting and positioning the combustion chamber and radiator within the casing, top and bottom panels, and a door intermediate said panels, all removably attached to the casing and constituting the front wall thereof, said door extending from adjacent the bottom of the control compartment to an elevation above the flue connection between the combustion chamber and radiator, the top panel extending from the door to the top of the casing, a liner for said panel extending from the top thereof downwardly to substantially the horizontal plane of the top of the control compartment, the radiator having a clean-out opening opposite said flue connection, and a closure for said clean-out opening, the closure having a peek hole and the liner of the top panel an opening registering with said peek hole.

3. In a furnace, a casing having air admitting means adjacent the bottom thereof and air outlet means at its top, an air impeller arranged to produce an upward flow of air through the casing, a combustion chamber supported within the casing, a radiator in front of the combustion chamber and communicating therewith, a burner unit below the combustion chamber and arranged to discharge its products into the latter, a housing below the radiator forwardly of the burner unit and enclosing a control chamber, fuel supply and control means within said chamber having communicative connection with the burner unit, baffle means within the rear of the casing intermediate the top and bottom of the combustion chamber and partially surrounding the latter for deflecting air rising through the casing adjacent the rear thereof forwardly, air deflecting means on opposite sides of the combustion chamber below the plane of said baffle means and extending rearwardly from the front of the combustion chamber to about the vertical plane of the front of the baffle means, and further air deflecting means extending about the front portion of the combustion chamber and forwardly therefrom and beneath the radiator.

4. In a furnace, a casing having air admitting means adjacent the bottom thereof and air outlet means at its top, an air impeller arranged to produce an upward flow of air through the casing, an assembly supported within the casing, said assembly including a combustion chamber, a radiator in front of the combustion chamber and communicating therewith, and a burner unit below the combustion chamber and arranged to discharge its products into the latter, a housing below the radiator forwardly of the burner unit and enclosing a control space, fuel supply and control means within said space having communicative connection with the burner unit, baffle means within the rear of the casing intermediate the top and bottom of the combustion chamber and partially surrounding the latter for deflecting air rising through the casing adjacent the rear thereof forwardly, air deflecting means on opposite sides of the combustion chamber below the plane of said baffle means and extending rearwardly from the front of the combustion chamber to about the vertical plane of the front of the baffle means, further air deflecting means extending about the front portion of the combustion chamber and forwardly therefrom and beneath the radiator, and seal strips rising from the last mentioned air deflecting means along each side of the radiator to near the top thereof.

5. In a furnace, a casing having air admitting means adjacent the bottom thereof and air outlet means at its top, air impelling means for producing upward flow of air through the casing, closure means constituting the front of the casing and removably attached thereto, a unitary structure including a combustion chamber supported within the casing for removal through the front thereof, a combustion device in operative relation to the combustion chamber, the casing including a vertical wall in outwardly spaced relation to the rear and lateral sides of the combustion chamber, substantially horizontal air deflecting means connected to said wall and extending laterally between said wall and the combustion chamber about the rear side of the latter intermediate the top and bottom thereof, and other generally horizontal air deflecting means carried by the unitary structure and extending about the front portion of the combustion chamber and located in a plane vertically spaced from the plane of the former air deflecting means.

6. In a furnace, a casing having air admitting means adjacent the bottom thereof and air outlet means at its top, air impelling means for producing upward flow of air through the casing, closure means constituting the front of the casing and removably attached thereto, an assembly including a combustion chamber and a radiator, said assembly being supported within the casing for removal through the front thereof, a combustion device in operative relation to the combustion chamber, the casing including a vertical wall in outwardly spaced relation to the rear and lateral sides of the combustion chamber, substantially horizontal air deflecting means connected to said wall and extending laterally between said wall and the combustion chamber about the rear side of the latter intermediate the top and bottom thereof, and other generally horizontal air deflecting means incorporated in the assembly and extending about the front portion of the combustion chamber and beneath the radiator and located a substantial distance below the plane of the former air deflecting means.

7. In a furnace, a casing having air admitting means adjacent the bottom thereof and air outlet means at its top, an air impeller for producing an upward flow of air through the casing, the front of the casing being constituted of closure means removably attached to the casing, an assembly including a combustion chamber, and a radiator at the front of the combustion chamber and communicatively connected thereto, a burner unit supported below the combustion chamber and arranged to discharge its products into the same, liners extending about the rear portion of the combustion chamber in spaced relation thereto and connected to the casing, baffle means attached to the liners and extending about the rear portion of the combustion chamber intermediate the top and bottom thereof, air deflecting means connected to and extending about the front portion of the combustion chamber adjacent the bottom thereof and projecting forwardly beneath the radiator, and other air deflecting means carried by the assembly adjacent the front side portions of the combustion chamber in a plane intermediate those of the said baffle means and the former air deflecting means.

8. In a furnace, a casing including side walls consisting of substantially parallel parts of opposed sheet metal plates and a back wall formed by integral parts of said plates that are turned toward each other in a plane at right angles to the former parts, the second mentioned parts having their adjacent edges connected together, closure means constituting the front wall of the casing and detachably connected to the front edge portions of the aforesaid plates, a top wall applied to the upper ends of the former walls, a base frame surmounted by the casing, said frame being constructed to admit air to the casing and said top wall having an opening for the outlet of air, air impelling means for inducing an upward flow of air through the casing, an assembly including a combustion chamber supported within the casing for removal through the front thereof, and a combustion device in operative relation to the combustion chamber.

9. In a furnace, a casing including side walls consisting of substantially parallel parts of opposed sheet metal plates and a back wall formed by integral parts of said plates that are turned toward each other in a plane at right angles to the former parts, the second mentioned parts having their adjacent edges connected together, closure means constituting the front wall of the casing and detachably connected to the front edge portions of the aforesaid plates, a flanged top wall applied to the upper end of the former walls, a base frame surmounted by the casing, said frame being constructed to admit air to the casing and said top wall having an opening for the outlet of air, air impelling means for inducing an upward flow of air through the casing, an assembly including a combustion chamber and a radiator in communication with and in front of said chamber, said assembly being supported within the casing for removal through the front thereof, and a combustion device in operative relation to the combustion chamber, the radiator having an outlet spud at its upper end and said top wall having a hole adjacent the front thereof in alignment with said spud.

10. In a furnace, the combination and arrangement of elements defined by claim 8, plus: liners extending rearwardly from the front edge portions of the sides of the casing in substantially parallel relation thereto for approximately half the depth of the casing and continuing about the rear of the combustion chamber in spaced relation to the latter and meeting at the transverse center of the back wall of the casing.

11. In a furnace, the combination and arrangement of elements defined by claim 8, plus: liners extending from the front edge portions of the sides of the casing rearwardly in substantially parallel relation thereto for approximately half the depth of the casing and continuing about the rear of the combustion chamber in spaced relation to the latter and meeting at the transverse center of the back wall of the casing, the front edge portions of the liners being flanged outwardly at right angles to the adjacent portions thereof, and the forward edges of said plates being turned inwardly upon themselves and thence toward each other to provide flanges that overlie the flanges of the liners, the lateral edges of said closure means being engaged with the flanges of said plates.

12. In a furnace, a casing including permanently connected side, rear and top walls and constructed to admit air adjacent its lower end and having air outlet means at its top, an air impeller for inducing an upward draft of air through the casing, a combustion chamber assembly, supports within the casing adjacent the side walls thereof, each support having an upwardly facing notch the front wall of which is upwardly and forwardly inclined, the assembly including laterally extending lugs arranged to rest on said supports and sustain the assembly within the casing, each lug having a bifurcated forward extension, the opposed walls of which are forwardly divergent and cooperate with the front wall of the corresponding notch thereby to properly position the assembly in a transverse direction within the casing, a burner unit supported in operative relation to the combustion chamber, fuel supply and control means, communicative connections between the same and the burner unit, and closure means detachably connected to the front of the casing.

13. A furnace according to claim 12, wherein said supports are provided with stops rearwardly of said notches, and said lugs are so related to the assembly that when they occupy the notches of the supports and engage said stops the assembly occupies normal upright position within the casing.

14. In a furnace, a casing including permanently connected side, rear and top walls, a base frame whereon the casing is mounted, the base frame being constructed to admit air to the casing and the top wall having a relatively large opening for the outlet of air, an air impeller within the bottom portion of the casing for including an upward draft of air through the casing, an assembly including a combustion chamber and a radiator in front of the combustion chamber and communicating therewith, the radiator being equipped with an outlet spud at the top thereof, a hole in the top wall forwardly of the aforesaid opening upwardly through which said spud is adapted to extend, supports inside the casing connected to the side walls thereof, the assembly including laterally extending lugs arranged to rest on said supports and sustain and position the assembly within the casing, a burner unit detachably connected to and suspended from the combustion chamber, a demountable housing within the casing in front of the burner unit and enclosing a control compartment, fuel supply and control means in said compartment, communicative connections between the same and the burner unit, and closure means detachably connected to the front of the casing.

15. In a furnace, a casing adapted for the circulation of air therethrough, a combustion chamber supported within the casing, a burner unit arranged to discharge its products into said chamber, the chamber having a front opening in the vicinity of admission of said products, and closure means for the front of the casing including a door provided with air openings, one of which latter openings is in the line of vision through said front opening of the combustion chamber.

16. In a furnace, a casing adapted for the circulation of air therethrough, a combustion chamber supported within the casing, a burner unit arranged to discharge its products into said chamber, the chamber having a front opening in the vicinity of admission of said products, a radiator disposed in front of the combustion chamber and provided with a rear opening aligned with the front opening of said chamber, a flue connection between the radiator and combustion chamber about said openings, the radiator having a clean-out opening in the front thereof opposite said rear opening, a closure for said clean-out opening having a peek hole, and closure means for the front of the casing including a door provided with air openings, one of which air openings is in the line of vision through said peek hole.

17. In a furnace, a casing adapted for the circulation of air therethrough, a combustion chamber and a radiator supported side by side within the casing, the combustion chamber having an outlet opening adjacent its lower end and the radiator having an inlet opening registering with said outlet opening, the combustion chamber and radiator being connected together about said openings, an outlet spud leading from the top portion of the radiator, a combustion device arranged to discharge its products into the bottom portion of the combustion chamber, a baffle within the combustion chamber separating the outlet opening of the latter from the region of discharge of said products and extending upwardly into the combustion chamber a substantial distance above said outlet opening, and a second baffle substantially nearer the upper end than the lower end of the first mentioned baffle and extending substantially horizontally from the side thereof remote from said outlet opening.

JOHN A. DAHLSTROM.

REFERENCES CITED

The following references are of record in the file of this patent:

UNITED STATES PATENTS

| Number | Name | Date |
|---|---|---|
| 1,256,328 | Kite | Feb. 12, 1918 |
| 1,782,530 | Dougherty | Nov. 25, 1930 |
| 1,834,288 | McCabe | Dec. 1, 1931 |
| 2,089,407 | Norris | Aug. 10, 1937 |
| 2,116,873 | Williams | May 10, 1938 |
| 2,292,082 | Miller | Aug. 4, 1942 |
| 2,373,900 | Livar | Apr. 17, 1945 |
| 2,378,485 | Jones | June 19, 1945 |
| 2,383,431 | Weyenberg | Aug. 21, 1945 |